UNITED STATES PATENT OFFICE 2,679,489

FIRE RETARDANT COATING COMPOSITION

George L. Cunningham, Cincinnati, Ohio, assignor to Waterloo Corporation, New York, N. Y., a corporation of New York No Drawing. Application February 3, 1953,
Serial No. 334,977

10 Claims. (Cl. 260—15)

This is a continuation-in-part of my application Ser. No. 145,903, filed February 23, 1950.

My invention relates to a composition which can be applied in the manner of a paint to the surface of wood, or other combustible material, and which will provide resistance to the spread of fire.

A composition of the above type must form a suitable adherent coating of substantial thickness and of a substantial degree of toughness and hardness. It must accomplish this while at the same time incorporating materials which, under sufficiently high temperature, will provide an incombustible, stable, foam-like structure which will insulate the coated surface from the source of heat and also exclude the free passage of air to the coated surface.

To accomplish the above I provide a composition having resin forming constituents, namely urea and formaldehyde together with a relatively large amount of a material, such as the ammonium or zinc compounds of orthophosphates and borates and a small amount of very finely divided inert, inorganic, solid to stabilize and strengthen the foam structure when formed.

A composition of the above type is entirely satisfactory when a sufficient coating has been applied to the surface to be protected. To apply a coating of the proper thickness economically it is necessary that the coating composition have a sufficient body or thickness that it will form a thin even coating when applied; that is, that it shall not be too watery or thin to form a coating of sufficient thickness in one, or at most two applications; that the coatings will level to a smooth finish, and that the coating composition shall be free from "ropiness" or other undesirable characteristics.

These conditions are difficult to meet with resin forming constituents, such as formaldehyde and urea because as the resinifying proceeds the thickness of the material increases. Such changes in thickness are difficult to control particularly under different temperature conditions.

In warm weather the reaction between the urea and formaldehyde tends to be too rapid and as a consequence the paint or coating composition becomes quite viscous before it can be used in a convenient mannner. The chemical reaction involved is exothermic and the evolution of heat speeds up the reaction so that each of these factors tends to cause the composition to thicken very rapidly.

In cold weather the reaction starts quite slowly and as the heat of reaction in this case is not generated as rapidly and has a relatively greater opportunity to be dissipated by conduction and convection to the atmosphere the reaction is not sufficiently rapid to prevent the paint or coating composition to remain quite thin and watery over a long period of time. This is a substantial obstacle to the use of paint, namely that in cold weather it is liable to remain too thin and watery to apply a proper coating, while in hot weather its viscosity will increase too rapidly to enable it to be applied easily, and in some cases may cause it to set before it can be applied at all.

These disadvantages are obviated in my present application which provides sufficient body and viscosity to the paint independently of the reaction between the resin forming ingredients. In addition to increasing the usable time of the composition the reaction between the urea and formaldehyde is retarded so that the viscosity or body of the paint does not change substantially over an extended period of time as, for example, two or three days.

In making up a coating composition or paint the urea and formaldehyde are kept separated until they are to be used. They are then mixed in an aqueous or water medium together with the ammonium phosphate or other flame-retarding reagent.

To provide the thickness or body to the aqueous solution thus attained a thickening agent is provided which is not salted out of the solution by the presence of the large amount of ammonium phosphate or other salt. Such salting out would cause the composition to become "ropy" and unworkable as a paint.

In the composition of my invention I therefore use thickening agents which are not salted out by the phosphates or other salts. Examples of such thickening agents are carboxyl methyl cellulose, methyl cellulose and polyvinyl alcohol. These thickening agents may be used in small quantities and generally not over 5% by weight of the composition.

In the case of carboxyl methyl cellulose there are several types as, for example, a low viscosity type, a medium viscosity type and a high viscosity type. The amount used in any case will depend upon the type employed. For example, less of the high viscosity type is required to obtain a given viscosity than is required if the low or medium type viscosity is employed.

Inasmuch as the composition is thickened initially, the formation of the resin is not required to give it the requisite thickness or body and the formation of the resin may be retarded. For this purpose a small amount of hexamethylene tetramine is added to this composition. The presence of this reagent retards the formation of the resin and so slows down the reaction rate that the composition may be retained in a usable form for upwards of fifty to sixty hours. Temperature conditions, therefore, do not have any substantial or major influence on the thickening. The paint may be used shortly after the elements of the composition are mixed and remain usable for two days or more regardless of weather conditions.

The relative proportions of the various constituents may vary within limits. The urea content of the composition should be from about 100% to 300% by weight of the formaldehyde content. The phosphate or borates should be in amount from about 200% to 400% by weight of the urea content of the composition. The hexamethylene tetramine becomes significantly effective at concentrations or proportions equal to about 5% by weight of the formaldehyde content, and may equal about 50% by weight of the formaldehyde content. Above 50% by weight of the hexamethylene tetramine the reaction becomes less desirable so that the hexamethylene tetramine may be used substantially in amounts from 5% to 50% by weight of the formaldehyde content, whether the formaldehyde be present in solid form as paraformaldehyde or as a solution. The thickening agent may be from about 0.1% to 5.0% by weight of the total mixture depending upon the particular thickener used. A smaller amount of thickener of high viscosity will equal a somewhat larger amount of thickener of low viscosity. The pigment or finely divided solids may equal 50% to 150% by weight of the urea content depending upon the covering power of the particular pigment or finely divided inert inorganic solid.

After the composition has been applied to a surface it will be set (due to the evaporation of water from the coating), the setting taking about two or three hours depending upon the temperature and humidity. Although the coatings at this stage will not be very hard and tough a chemical reaction sets in so that within twelve to twenty-four hours after the composition has been applied the coating will be hard and tough. The composition when applied as a coating has good leveling properties and after being completely set and hard has elastic and tough characteristics rather than being brittle.

Examples of the composition are as follows:

*Example I*

37.5 parts monoammonium dihydrogen phosphate, 5 parts titanium dioxide (water dispersion type), and 10 parts urea are mixed together and ground to 100 mesh, or better to 200–325 mesh. (The use of fine powdered mixtures increases the rate at which the orthophosphate goes into solution and enhances the smoothness of the resulting coating.)

To this mixture is added an aqueous solution made of the following ingredients:

10 parts 40% commercial formaldehyde solution, 20 parts water, 4 parts hexamethylene tetramine and 0.23 part carboxy methyl cellulose, high viscosity type. The major part of the ammonium dihydrogen orthophosphate will quickly go into solution. With stirring at intervals during the first few minutes after being mixed the mixture is a very smooth, creamy slurry. It can be used immediately as a coating material to provide fire-retarding properties. After being mixed for about twelve hours the paint has thickened a little, and is now very "oily" and is at the best time for use. The titanium oxide is an insoluble pigment but it will have little or no tendency to settle out since even from the beginning of the mixture the paint has had body and viscosity. The thickening agents also tend to keep the titanium dioxide in suspension. In any case a slight agitation of the paint will restore the titanium to a state of complete suspension. When this composition is applied, for example, to wood by dipping, spraying or painting, it will go on very smoothly giving a uniform surface which is hard, tough and elastic. It has good levelling qualities. It will set in about two or three hours to a firm surface which permits another coating to be added. The coating will not peel, flake or dust off in use.

*Example 2*

The same basic mixture as in Example I except that diammonium acid orthophosphate is used instead of monoammonium dihydrogen orthophosphate.

*Example 3*

The same basic mixture as given in Example I except that 0.5 part of polyvinyl alcohol is used instead of the 0.23 part carboxy methyl cellulose.

*Example 4*

The same basic mixture as given in Example I except that 0.5 part of methyl cellulose is used instead of the 0.23 part of carboxy methyl cellulose, high viscosity.

*Example 5*

37.5 parts monoammonium dihydrogen orthophosphate, 5 parts titanium dioxide (water dispersion type), 10 parts urea and 0.23 part carboxy methyl cellulose are mixed together and ground to 200–325 mesh. A separate mixture is made which is composed of 4.0 parts paraformaldehyde and 4.0 parts hexamethylene tetramine. To prepare the paint the two powder mixtures are mixed together and 30 parts of water added. This will give a smooth creamy slurry which is immediately suitable for use as a fire-retardant coating. However it will improve slightly within the next twelve hours. The mixture will remain usable for at least sixty hours.

*Example 6*

The same basic mixture as given in Example I except that the titanium dioxide is replaced with 5 parts finely divided calcium carbonate, or any other pigment such as red $Fe_2O_3$, yellow hydrated $Fe_2O_3$, black $Fe_2O_3$, or any other suitable pigment. This includes clay, kaolin, feldspar, silica, green $Cr_2O_3$, etc.

The ammonium orthophosphates may be replaced in whole or in part by zinc phosphates or zinc or ammonium borates.

All types of formaldehyde, that is, formaldehyde, paraformaldehyde, etc. may be used in the above examples.

Through the above invention I have provided a paint-like coating composition which does not thicken or set to an unusual degree within a matter of two or three days. It may be made up and left to stand over night and used throughout the next day and the succeeding day. The resulting coating is hard, elastic and holds the fire-retardant agent uniformly in the composition. When in contact with flame or excessive heat the paint swells by the formation of very fine bubbles, the formation of which is aided by the presence of very divided solid, inert, inorganic, material of which an excellent example is the titanium dioxide.

Having described my invention, what I claim is:

1. A paint-like flame-retarding coating composition which comprises in an aqueous medium formaldehyde, urea, in amount by weight equal to from 100% to 300% of the formaldehyde content of the composition, a member of a flame-retarding group consisting of the ammonium and zinc salts of the orthophosphates and borates in amount by weight equal to from 200% to 400% of the urea content, a thickening agent stable in salt solution in amount by weight equal to from 0.1% to 5.0% of the total mixture, a finely divided inert, inorganic, solid in amount by weight equal to from 50% to 150% of the urea content and hexamethylene tetramine in amount by weight equal to from 5% to 50% of the formaldehyde content of the composition.

2. The composition of claim 1 in which the thickening agent is carboxy methyl cellulose.

3. The composition of claim 1 in which the thickening agent is methyl cellulose.

4. The composition of claim 1 in which the thickening agent is polyvinyl alcohol.

5. The composition of claim 1 in which the member of the flame-retarding group is an ammonium orthophosphate.

6. The composition of claim 1 in which the finely divided inert, inorganic solid is titanium dioxide.

7. A flame-retarding paint-like coating which comprises approximately 37.5 parts of mono-ammonium dihydrogen phosphate; 5 parts of titanium dioxide; 10 parts of urea; 10 parts of 40% formaldehyde solution; 20 parts of water; 4 parts of hexamethylene tetramine, and less than 1 part of a thickening agent soluble in salt solution.

8. The composition of claim 7 in which said thickening agent is carboxy methyl cellulose.

9. The composition of claim 7 in which said thickening agent is methyl cellulose.

10. The composition of claim 7 in which said thickening agent is polyvinyl alcohol.

References Cited in the file of this patent

UNITED STATES PATENTS

| Number | Name | Date |
| --- | --- | --- |
| 2,452,054 | Jones et al. | Oct. 26, 1948 |